(12) United States Patent
Barnidge et al.

(10) Patent No.: US 8,647,727 B1
(45) Date of Patent: Feb. 11, 2014

(54) OPTICAL ASSEMBLY WITH ADHESIVE LAYERS CONFIGURED FOR DIFFUSION

(75) Inventors: Tracy J. Barnidge, Marion, IA (US); James D. Sampica, Springville, IA (US)

(73) Assignee: Rockwell Colllins, Inc., Cedar Rapids, IA (US)

( * ) Notice: Subject to any disclaimer, the term of this patent is extended or adjusted under 35 U.S.C. 154(b) by 0 days.

(21) Appl. No.: 13/538,957

(22) Filed: Jun. 29, 2012

(51) Int. Cl.
*G02B 5/02* (2006.01)
*B32B 7/12* (2006.01)
*B32B 37/12* (2006.01)

(52) U.S. Cl.
USPC .............. 428/1.5; 349/64; 349/112; 359/599; 156/60

(58) Field of Classification Search
USPC ............ 428/1.3, 1.5, 214, 354; 156/106, 285, 156/543, 555, 60; 349/64, 112; 359/599
See application file for complete search history.

(56) References Cited

U.S. PATENT DOCUMENTS

| | | | |
|---|---|---|---|
| 3,089,801 A | 5/1963 | Tierney et al. |
| 3,616,197 A | 10/1971 | Amberg et al. |
| 3,851,758 A | 12/1974 | Makhijani et al. |
| 4,078,962 A | 3/1978 | Krueger |
| 4,188,254 A | 2/1980 | Hemperly, Jr. |
| 4,235,951 A | 11/1980 | Swarovski |
| 4,737,182 A | 4/1988 | Fecik et al. |
| 4,747,577 A | 5/1988 | Dimock |
| 4,756,735 A | 7/1988 | Cathers et al. |
| 5,108,532 A | 4/1992 | Thein et al. |
| 5,566,840 A | 10/1996 | Waldner et al. |
| 5,592,288 A | 1/1997 | Sampica et al. |
| 5,678,303 A | 10/1997 | Wichmann |
| 5,918,517 A | 7/1999 | Malapert et al. |
| 5,950,512 A | 9/1999 | Fields |
| 5,959,762 A | 9/1999 | Bandettini et al. |
| 6,128,066 A | 10/2000 | Yokozeki |
| 6,366,013 B1 | 4/2002 | Leenders et al. |
| 6,388,724 B1 | 5/2002 | Campbell et al. |
| 6,481,482 B1 | 11/2002 | Shimotomai |
| 6,614,057 B2 | 9/2003 | Silvernail et al. |
| 6,681,668 B1 | 1/2004 | Smirle |
| 6,803,245 B2 | 10/2004 | Auch et al. |
| 6,832,538 B1 | 12/2004 | Hwang |

(Continued)

FOREIGN PATENT DOCUMENTS

EP 0556351 6/1995
EP 0 711 103 5/1996

(Continued)

OTHER PUBLICATIONS

JPO Website Machine English Translation of JP 2006-348208, Ishii et al., Dec. 28, 2006.*

(Continued)

*Primary Examiner* — Sophie Hon
(74) *Attorney, Agent, or Firm* — Donna P. Suchy; Daniel M. Barbieri

(57) ABSTRACT

A optical assembly is utilized in various applications including in a display assembly. The optical assembly includes a first translucent substrate, a second translucent substrate, a first layer of adhesive, and a second layer of adhesive. The first layer of adhesive is bonded to the first translusive substrate and the second layer of adhesive is bonded to the second translusive substrate. The first layer of adhesive is configured for diffusive effects, and the second layer of adhesive is configured for diffusive effects.

13 Claims, 3 Drawing Sheets

(56) References Cited

U.S. PATENT DOCUMENTS

| | | | |
|---|---|---|---|
| 6,842,288 B1 | 1/2005 | Liu et al. | |
| 6,984,545 B2 | 1/2006 | Grigg et al. | |
| 6,998,648 B2 | 2/2006 | Silvernail | |
| 7,273,403 B2 | 9/2007 | Yokota et al. | |
| 7,349,154 B2* | 3/2008 | Aiura et al. | 359/449 |
| 7,381,110 B1 | 6/2008 | Sampica et al. | |
| 7,435,311 B1 | 10/2008 | Marzen et al. | |
| 7,452,258 B1 | 11/2008 | Marzen et al. | |
| 7,566,254 B2 | 7/2009 | Sampica et al. | |
| 7,814,676 B2 | 10/2010 | Sampica et al. | |
| 7,929,086 B2* | 4/2011 | Toyama et al. | 349/117 |
| 8,038,498 B2 | 10/2011 | Miyauchi et al. | |
| 8,118,075 B2 | 2/2012 | Sampica et al. | |
| 8,137,498 B2 | 3/2012 | Sampica et al. | |
| 2001/0053648 A1 | 12/2001 | Furukawa et al. | |
| 2002/0186343 A1 | 12/2002 | Liao et al. | |
| 2002/0187284 A1* | 12/2002 | Kinoshita et al. | 428/1.3 |
| 2003/0038916 A1* | 2/2003 | Nakano et al. | 349/158 |
| 2003/0043315 A1* | 3/2003 | Umemoto et al. | 349/65 |
| 2003/0089214 A1 | 5/2003 | Fukuta et al. | |
| 2003/0156238 A1* | 8/2003 | Hiraishi et al. | 349/112 |
| 2003/0174396 A1* | 9/2003 | Murayama et al. | 359/453 |
| 2003/0180528 A1 | 9/2003 | Flosenzier et al. | |
| 2003/0189606 A1 | 10/2003 | Moon et al. | |
| 2004/0066645 A1* | 4/2004 | Graf et al. | 362/31 |
| 2005/0126679 A1 | 6/2005 | Kim | |
| 2005/0249946 A1 | 11/2005 | Hsu et al. | |
| 2006/0035060 A1 | 2/2006 | Koyama et al. | |
| 2006/0098452 A1 | 5/2006 | Choi et al. | |
| 2006/0215265 A1* | 9/2006 | Miyatake et al. | 359/494 |
| 2006/0245171 A1 | 11/2006 | Kim et al. | |
| 2006/0290253 A1* | 12/2006 | Yeo et al. | 313/116 |
| 2007/0228586 A1* | 10/2007 | Merrill et al. | 264/1.34 |
| 2007/0297736 A1 | 12/2007 | Sherman et al. | |
| 2008/0305721 A1 | 12/2008 | Ohashi et al. | |
| 2009/0040772 A1* | 2/2009 | Laney | 362/353 |
| 2009/0046229 A1 | 2/2009 | Umemoto et al. | |
| 2009/0120572 A1 | 5/2009 | Sampica et al. | |
| 2009/0120585 A1 | 5/2009 | Sampica et al. | |
| 2009/0153783 A1* | 6/2009 | Umemoto | 349/96 |
| 2009/0186218 A1 | 7/2009 | Sampica et al. | |
| 2009/0279030 A1* | 11/2009 | Toyama et al. | 349/117 |
| 2009/0279175 A1* | 11/2009 | Laney et al. | 359/599 |
| 2010/0103353 A1* | 4/2010 | Yamada | 349/96 |
| 2010/0297406 A1 | 11/2010 | Schaffer et al. | |
| 2011/0075070 A1* | 3/2011 | Kitagawa et al. | 349/64 |
| 2011/0141405 A1* | 6/2011 | Kitagawa et al. | 349/74 |
| 2011/0165361 A1 | 7/2011 | Sherman et al. | |

FOREIGN PATENT DOCUMENTS

| | | |
|---|---|---|
| EP | 0 711 103 B1 | 3/2000 |
| JP | 1-210328 A | 8/1989 |
| JP | 5-200880 A | 8/1993 |
| JP | 5-293895 A | 11/1993 |
| JP | 6-051484 A | 2/1994 |
| JP | 9-057779 A | 3/1997 |
| JP | 10-156853 A | 6/1998 |
| JP | 10-244589 A | 9/1998 |
| JP | 2000-141388 A | 5/2000 |
| JP | 2001-166272 | 6/2001 |
| JP | 2002-313688 | 10/2002 |
| JP | 2004-058349 | 2/2004 |
| JP | 2004-233590 A | 8/2004 |
| JP | 2006-218658 A | 8/2006 |
| JP | 2006-334912 A | 12/2006 |
| JP | 2007-206559 A | 8/2007 |
| JP | 2008-238607 A | 10/2008 |
| WO | WO-93/05634 | 3/1993 |
| WO | WO-2004/046230 | 6/2004 |
| WO | WO 2005/098522 | 10/2005 |
| WO | WO 2007/063818 | 6/2007 |

OTHER PUBLICATIONS

JPO Website Machine English Translation of JP 2004-354645, Takiyama Masaharu, Dec. 16, 2004.*

Office Action for U.S. Appl. No. 12/009,472, mail date Apr. 16, 2012, 16 pages.

Office Action for U.S. Appl. No. 12/786,169, mail date Jul. 20, 2012, 8 pages.

Office Action for U.S. Appl. No. 13/420,381, mail date Sep. 18, 2012, 9 pages.

Office Action for U.S. Appl. No. 12/009,472, mail date Nov. 9, 2012, 15 pages.

Office Action for U.S. Appl. No. 12/009,482, mail date Nov. 21, 2012, 20 pages.

Office Action for U.S. Appl. No. 12/009,472, mail date Mar. 20, 2013, 15 pages.

Notice of Allowance for U.S. Appl. No. 12/786,169, mail date Mar. 28, 2013, 6 pages.

Notice of Allowance for U.S. Appl. No. 13/420,381, mail date May 20, 2013, 8 pages.

Kipp, Plastic Material Data Sheets, Online version available at: http://www.knovel.com/web/portal/browse/display?_EXT_KNOVEL_DISPLAY_bookid=1023&VerticalID=0, at least as early as Aug. 10, 2011, 6 pages.

Walker, GD-Itronix Dynavue Technology, The Ultimate Outdoor-Readable Touch-Screen Display, Rugged PC Review, 4 pages, Jun. 4, 2007.

Office Action for U.S. Appl. No. 12/009,372, mail date Dec. 20, 2010, 10 pages.

Office Action for U.S. Appl. No. 12/009,372, mail date Jun. 13, 2011, 9 pages.

Notice of Allowance for U.S. Appl. No. 12/009,372, mail date Oct. 13, 2011, 8 pages.

Office Action for U.S. Appl. No. 12/009,373, mail date Dec. 30, 2009, 14 pages.

Notice of Allowance for U.S. Appl. No. 12/009,373, mail date Jun. 16, 2010, 4 pages.

Office Action for U.S. Appl. No. 12/009,393, mail date Jul. 20, 2011, 8 pages.

Notice of Allowance for U.S. Appl. No. 12/009,393, mail date Nov. 14, 2011, 7 pages.

Office Action for U.S. Appl. No. 12/009,375, mail date Mar. 28, 2011, 9 pages.

Office Action for U.S. Appl. No. 12/009,375, mail date Jul. 22, 2011, 8 pages.

Office Action for U.S. Appl. No. 12/009,472 mail date Jan. 14, 2011, 14 pages.

Office Action for U.S. Appl. No. 12/009,472, mail date Nov. 3, 2011, 15 pages.

Office Action for U.S. Appl. No. 12/009,482, mail date Aug. 16, 2011, 16 pages.

Office Action for U.S. Appl. No. 12/009,482, mail date Feb. 21, 2012, 20 pages.

* cited by examiner

OPTICAL ASSEMBLY WITH ADHESIVE LAYERS CONFIGURED FOR DIFFUSION

CROSS-REFERENCE TO RELATED APPLICATIONS

This application is related to U.S. patent application Ser. No. 12/009,375, filed Jan. 18, 2008; U.S. patent application Ser. No. 12/009,482, filed Jan. 18, 2008; U.S. patent application Ser. No. 12/009,393, filed Jan. 18, 2008, now U.S. Pat. No. 8,137,498; U.S. patent application Ser. No. 12/009,373, filed Jan. 18, 2008, now U.S. Pat. No. 7,814,676; U.S. patent application Ser. No. 12/009,372, filed Jan. 18, 2008, now U.S. Pat. No. 8,118,075; U.S. patent application Ser. No. 12/200,9472, filed Jan. 18, 2008; and U.S. patent application Ser. No. 08/430,966, filed Apr. 28, 1995, now U.S. Pat. No. 5,592,288, all of which are incorporated herein by reference in their entireties and assigned to the assignee of the present application.

BACKGROUND

The present disclosure relates generally to the field of optical assemblies. More particularly, the present disclosure is related to systems and methods for optical assemblies (e.g. display assemblies) having one or more adhesive layers.

Conventionally, optical assemblies are utilized in a wide variety of applications including but not limited to applications for displaying, targeting, sensing, etc. Optical assemblies often include a number of layers or components that are coupled together by an adhesive. One exemplary type of optical assembly is a laminated optical assembly.

Optical assemblies include display assemblies, such as laminated display assemblies. Conventional display assemblies often include a display element (e.g., an emissive display element such as an organic light emitting diode (OLED) display element, a liquid crystal display (LCD) element, a plasma element, etc.). The display assembly can also include one or more optical layers and/or optical components. The additional optical layers can be laminated to the display element.

Conventional optical assemblies are often used with a diffuser which can be disposed between a backlight and a display element (e.g., an LCD element). The diffuser more uniformly distributes light through the display element for better image quality. The backlight can be an incandescent backlight, a light emitting diode (LED) backlight, a fluorescent backlight, etc. In one exemplary display application, an avionics display application, the diffuser should generally be compatible with packaging approaches for rugged applications.

Conventional diffusers include surface relief diffusers and plastic bulk diffusers. Plastic surface relief diffusers generally require a substantial backlight cavity depth to achieve a desired uniformity. When utilized with LED backlights, plastic surface relief diffusers may require higher LED counts to achieve a desired uniformity. In addition, plastic surface relief diffusers often require an air interface between the display element (e.g. the LCD) and the diffusion surface and therefore cannot generally be laminated or bonded to the display element. In multi-layer display applications, plastic surface relief diffusers need of an air interface limits the accuracy of alignment between display elements (e.g., no direct bonding to fix relative position between elements) which may result in degraded image quality.

Plastic surface relief diffusers can also be disadvantageous because they reduce transmissiveness efficiency due to reflected light at the air interface and because contact with liquids, such as condensing moisture, can significantly reduce or eliminate light diffusion properties. Plastic surface relief diffusers require skilled handling techniques and attachment to a rigid substrate to be properly mounted in optical cavities. Plastic surface relief diffusers generally add to the cost, weight and production steps associated with the display assembly. Plastic surface relief diffuses are also very sensitive to damage due to incidental contact, and can be easily contaminated.

Conventional plastic bulk diffusers suffer from some of the same drawbacks as plastic surface relief diffusers. Plastic bulk diffusers are incompatible with current liquid bonding and dry film lamination techniques due to poor adhesion. Further, plastic bulk diffusers require one or more combinations of surface modifications (e.g., honing, etc.). Bulk diffusers also require increased backlight cavity depth or higher LED count to achieve desired uniformity. In addition, plastic bulk diffusers add to the cost, weight and production steps (e.g. bonding, bonding perimeters, cleaning, etc.) associated with display assembly.

Therefore, there is a need for an optical assembly which does not require a plastic surface relief diffuser or a bulk diffuser. Further, there is a need for an optical assembly which provides desired uniformity without requiring surface relief diffusers or bulk diffusers. Yet further, there is a need for an optical assembly which can be produced with fewer process steps. Still further, there is a need for a light weight, low cost optical assembly with acceptable diffusion characteristics. Yet further, there is a need for a laminated display assembly that does not require a conventional diffuser. Yet further, there is a need for a lower cost, light weight and rugged display assembly.

SUMMARY

An exemplary embodiment relates to an optical assembly including a first translucent substrate, a second translucent substrate, a first layer of adhesive, and a second layer of adhesive. The first layer of adhesive is bonded to the first translusive substrate and the second layer of adhesive is bonded to the second translucent substrate. The first layer of adhesive is configured for diffusive effects and the second layer of adhesive is configured for diffusive effects.

Another exemplary embodiment relates to an optical assembly. The optical assembly includes a first translucent substrate, a second translucent substrate, a first layer of adhesive, a second layer of adhesive, and a third layer of adhesive. The first layer of adhesive is bonded to the first translucent substrate and is configured for diffusive effects. The second layer of adhesive is bonded to the second translucent substrate and is configured for diffusive effects. The third layer of adhesive is disposed between the first layer of adhesive and the second layer of adhesive and is configured for diffusive effects.

Another embodiment relates to a method for making a laminated optical assembly. The method includes providing a first adhesive layer including particles for enhancing diffusion to a first side of a first substrate. The method also includes providing a second adhesive layer including particles for enhancing diffusion to a second side of a second substrate. The method also includes laminating the first substrate and the second substrate to provide the optical assembly.

Another exemplary embodiment relates to an optical assembly. The optical assembly includes a backlight, a first substrate provided above the backlight, a second substrate provided above the first substrate, the first adhesive layer disposed on a first side of the first substrate, and a second adhesive layer disposed on a third side of the second substrate. The first side is opposite of a second side of the first substrate. The second side is closer to the backlight than the first side. The first adhesive layer includes particles for increasing optical diffusion. The third side is opposite a fourth side of the second substrate. The fourth side is closer to the backlight than the fourth side. The second adhesive layer includes particles for increasing optical diffusion.

BRIEF DESCRIPTION OF THE DRAWINGS

Exemplary embodiments are described below with reference to the accompanying drawings, wherein like reference designators denote like elements and.

DETAILED DESCRIPTION OF EXEMPLARY EMBODIMENTS

Figure 1:
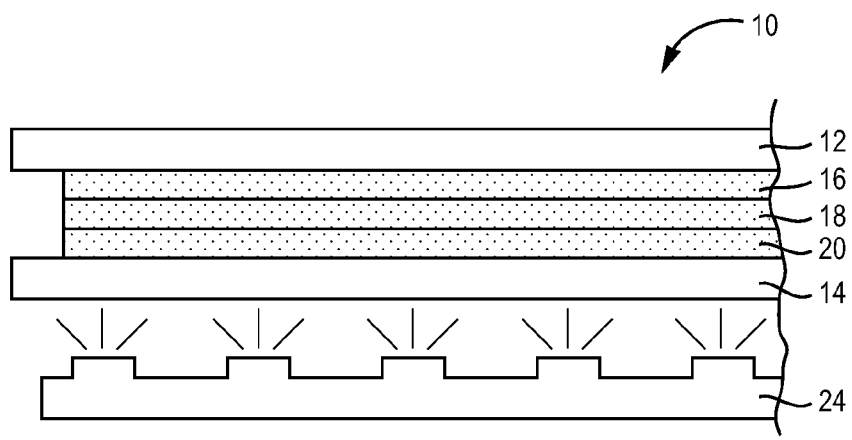
FIG. 1 is a side view schematic drawing of an optical assembly in accordance with an exemplary embodiment.

Before describing in detail the particular improved system method, it should be observed that the invention includes a novel structural combination of optical components, but is not limited to any particular detailed configurations thereof. Accordingly, the structure, methods, functions and arrangement of the components have been illustrated in the drawings by readily understandable schematic representations in order not to obscure the disclosure with the structure details which will be readily apparent to one skilled in the art having the benefit of the description herein. Further, the invention is not limited to the particular embodiments depicted in the exemplary drawings, but should be construed in accordance with the language of the claims.

Referring generally to the figures, an optical assembly, such as a display assembly, utilizes one or more adhesive layers configured to provide optical diffusion. In one embodiment, a dry film adhesive material with optical diffusion properties can replace plastic surface relief diffusers and plastic bulk diffusers to overcome limitations associated with such diffusers. In one embodiment, the depth of the optical cavity can be reduced by using a rear adhesive joint with a controlled optically diffuse adhesive layer. In another embodiment, transmissive efficiency can be increased by reducing deflections associated with conventional diffusers of an LCD assembly. In another embodiment, improved environmental performance can be achieved as well as a display assembly which is not susceptible to surface wetting of liquids or surface contamination.

In still another embodiment, the optical assembly uses existing direct dry Film™ lamination processes which improve overall robustness of the optical stack with respect to mechanical vibration, shock and impact. Diffusion density may be optimized by layering adhesive films to required thicknesses using existing lamination methods. Optical coupling of multi-layer displays via adhesive layers configured for diffusion can reduce or eliminate moiré interference patterns and maintain relative alignment between display elements according to another embodiment.

With reference to FIG. 1, an optical assembly 10 can be embodied as a display assembly, a light control or other optical component. Optical assembly 10 includes a substrate 12, a substrate 14, an adhesive layer 16, an adhesive layer 18, and an adhesive layer 20. Layers 16, 18 and 20 are configured for diffusion in one embodiment. In one embodiment, layers 16, 18, and 20 are configured for light diffusion by including matter that increases the haze characteristic of the layer (e.g. have increases to 80 percent or more in one embodiment).

Assembly 10 can include additional layers or optical components including display elements, polarizers, filters, diffusers, wave plates, etc. Assembly 10 can be laminated as described below in one embodiment.

Substrates 12 and 14 can be a glass material suitable for optical applications. Substrates 12 and 14 are transmissive or translucent material in one embodiment. Layers 12 and 14 can be rigid, flexible, flat or curved depending upon design criteria. In one embodiment, substrates 12 and 14 can be thick or thin plates.

Optical assembly 10 can be provided above a backlight embodied as an LED backlight 24. Backlight 24 is not shown in a limiting fashion. Any type of backlight 24 can be used with assembly 10. The distance between backlight 24 and substrate 14 can be relatively small due to the use of adhesive layers 16, 18 and 20 in one embodiment.

Adhesive layers 16, 18 and 20 include an optically clear adhesive matrix allowing light transmissiveness through assembly 10 in one embodiment. Adhesive layers 16, 18 and 20 can be 25-500 microns thick. In other embodiments, layers 16, 18, and 20 can be thicker (e.g. 1 mm or more) or thinner depending upon design criteria. Layer 18 can be optional. Although shown in FIG. 1 as having the same thickness, layers 16, 18 and 20 can have different thicknesses from each other in alternative embodiments.

Layers 16, 18 and 20 have a transmissiveness of between 80 and 96 percent and a haze between 30 and 98 percent in one embodiment. Layers 16, 18 and 20 are configured for increased diffusion characteristics or effects and can be a clear optical adhesive material doped with particles. Layers 16, 18 and 20 can be adjusted to have particular transmissiveness and haze characteristics. The concentration of the particles can control of haze and transmissiveness characteristics. Layers 16, 18 and 20 can have a light transmissiveness of 93% and a haze of 85% in one embodiment. Although certain transmissiveness and haze characteristics are discussed, layers 16, 18 and 20 can have other transmissiveness and haze characteristics.

Matrix material associated with layers 16, 18, and 20 can be a dry film adhesive in one embodiment. Dry film adhesive can be provided with a sheet which can be laminated in a direct dry film lamination process. Layers 16, 18 and 20 advantageously eliminate the use of conventional diffusers in one embodiment.

The adhesive matrix material associated with layers 16, 18 and 20 is doped with the ceramic or glass particles in one embodiment. The ceramic or glass particles have a different refractive index than the adhesive material so that light scatters when it strikes particles in the adhesive matrix material, thereby increasing diffusion in one embodiment. The particles can be ceramic beads or glass spheres in one embodiment. The concentration of particles can be varied to achieve the desired optical properties. Other types of particles (e.g., metal, plastic, etc.) can also be utilized.

Various transmissiveness and haze values can be utilized depending upon applications, specifications, and design criteria. By using a layered approach as show in FIG. 1, the appropriate total diffusion or haze can be accurately provided.

Figure 2:
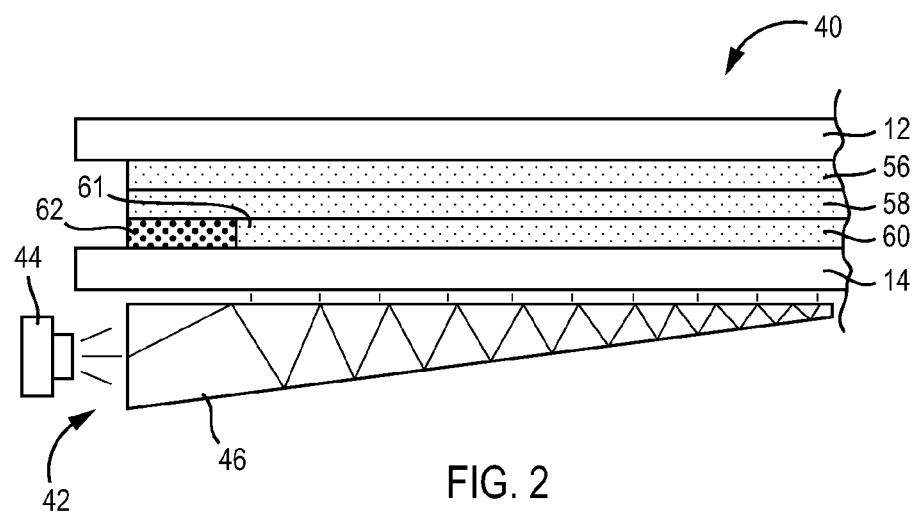
FIG. 2 is a side view schematic drawing of an optical assembly in accordance with another exemplary embodiment.

With reference to FIG. 2, an optical assembly 40 includes substrates 12 and 14 provided above a backlight source 42 in one embodiment. Backlight source 42 can be comprised of a light source 44 and a light guide 46. Light source 44 can be any type of light source, including an LED light source, an incandescent light source, an electroluminescence light source, a fluorescent light source, etc.

Assembly 40 includes an adhesive layer 56, an adhesive layer 58 and an adhesive layer 60 between substrates 12 and 14 in one embodiment. Layers 56, 58 and 60 are 250-500 microns thick and configured for light diffusion in one embodiment. Layer 58 is optional. Layers 56, 58 and 60 can be made from similar materials to layers 16, 18 and 20. There can also be more or less adhesive layers in alternative embodiments of assembly 40.

Layer 60 includes a region 62 having higher diffusion (e.g. haze) and lower transmissiveness than layers 56, 58 and a remainder 61 of layer 60 in one embodiment. Region 62 is preferably configured to provide localized diffusion for edge brightness nonuniformities. Region 62 can be configured to have an exemplary haze of 80% and a transmissiveness of 90%. Layers 56, 58 and 60 are configured for diffusive effects and have an exemplary transmissiveness of 93% and a haze of 40%. Although particular transmissiveness and haze values are described, alternate values can be utilized without departing from the invention.

Optical assembly 40 can be an edge lit display. Light source 44 on one side can eject light and provide more light to the near side than the far side. By providing more diffusion at the region 12 associated with light source 44, scalloping of light can be reduced. By using layer 60 with region 62, source 44 can be closer to assembly 40.

Figure 3:
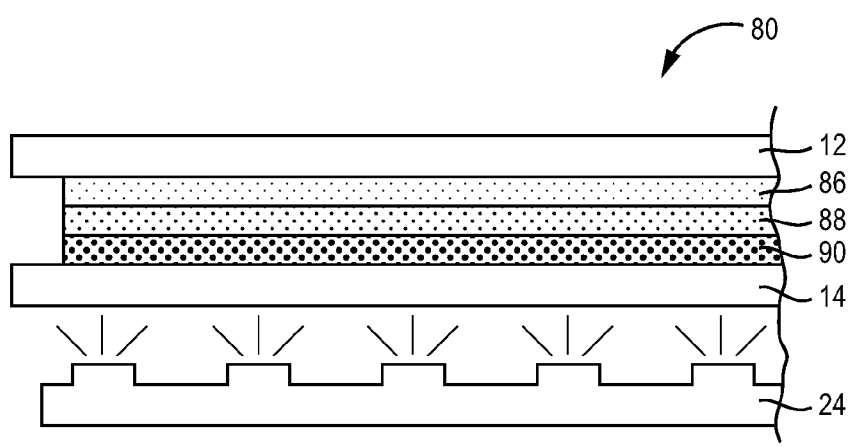
FIG. 3 is a side view schematic drawing of an optical assembly in accordance with yet another exemplary embodiment.

With reference to FIG. 3, an optical assembly 80 includes substrate 12, substrate 14, and adhesive layers 86, 88, and 90 in one embodiment. Assembly 80 is provided above backlight 24. Layers 86, 88 and 90 are configured for diffusive effect and can be similar to layers 16, 18 and 20. Layer 86 has higher transmissiveness and lower haze than layer 88, and layer 90 has lower transmissiveness and higher haze than layer 88 in one embodiment.

Layers 86, 88 and 90 are configured for progressive diffusion of light in one embodiment. In one embodiment, layer 86 has a transmissiveness of 93% and a haze of 30%, layer 88 has a transmissiveness of 85% and a haze of 45%, and layer 90 has a transmissiveness of 80% and a haze of 60%. Although particular haze and transmissiveness values are described, the values are exemplary only and do not limit the scope of the invention.

Figure 4:
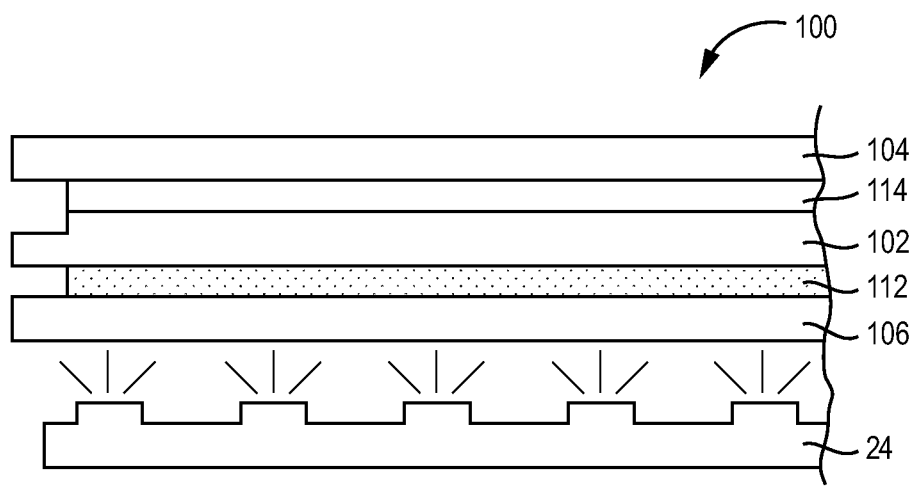
FIG. 4 is a side view schematic drawing of a display assembly in accordance with a further exemplary embodiment.

With reference to FIG. 4, a display assembly 100 includes a substrate 104, a substrate 106, an adhesive layer 112 and an adhesive layer 114 in one embodiment. Adhesive layer 112 is preferably configured for diffusive characteristics in one embodiment.

Display assembly 100 may be a generally planar display assembly, and may be a rigid, semi-rigid, or flexible display. In some embodiments, display element 102 is or includes a liquid crystal display (LCD) assembly. In other embodiments, other types of displays may be used or more than one display element can be used in assembly 100.

In one embodiment, display assembly 100 is laminated and includes adhesive layers 112 and 114. Assembly 100 may comprise a variety of components, either individually, or in combination, including a cover glass (e.g., a rigid or semi-rigid and generally transparent substrate, etc.), a touch screen display (e.g., configured to receive inputs via a stylus, a fingertip, etc.), optical enhancement or retardation films, and the like.

Traditional methods of applying cover assemblies involve multiple lamination steps of differing types. For example, to bond display element 102, adhesive layers 112 and 114 would first be cut to size and then laminated to a surface of display element 102 or substrates 104 and 106 (e.g., via a flexible-to-rigid lamination process), after which the cover glass would then be laminated to the display via the adhesive (e.g., via a rigid-to-rigid lamination process). Various embodiments herein are directed to assemblies and methods of assembly that may reduce the number of steps involved, and therefore reduce the time and cost required in connection with bonding cover assemblies to displays such as LCD displays (e.g., by reducing the number of cutting operations required to otherwise cut individual components such as an adhesive and a diffuser film to specific sizes).

In one embodiment, display element 102 includes a liquid crystal display including polarizers and other display components. For example, according to one embodiment, display element 102 may include a first polarizer, a glass substrate, a liquid crystal, a second glass substrate, and a second polarizer.

In some embodiments, one or both of adhesive layer 112 and adhesive layer 114 may comprise a pressure sensitive adhesive (PSA) configured for enhanced diffusion characteristics. In other embodiments, other suitable types of adhesives may be configured for diffusion as adhesive layer 112 and/or second adhesive layer 114, such as acrylic-base adhesives, silicone epoxy adhesives, or adhesives having other suitable chemistry, configured for enhanced diffusion. In one embodiment, only adhesive layer 114 is configured for diffusion.

According to an exemplary embodiment, adhesive layer 112 and adhesive layer 114 may have substantially similar thicknesses, while in other embodiments, adhesive layer 112 and second layer 114 may have different thicknesses. For example, adhesive layer 112 can be a relatively thicker adhesive layer (e.g., a relatively thicker layer of PSA) and adhesive layer 114 may be a relatively thinner adhesive layer (e.g., a relatively thinner layer of PSA). In one embodiment, adhesive layer 112 may be a relatively thinner layer of pressure sensitive adhesive having a thickness of approximately 0.001 inches, and second adhesive layer 114 may be a relatively thicker layer of pressure sensitive adhesive having a thickness of approximately 0.007 inches. In other embodiments, the thicknesses of adhesive layer 112 and adhesive layer 114 may be varied (e.g., in one embodiment, adhesive layer 114 is approximately 0.040 inches thick, etc.). In other embodiments, one or both adhesive layers 112 or 114 may be as thick as 0.060 inches, 0.100 inches, or greater than 0.100 inches.

According to various exemplary embodiments, adhesive layers 112 and 114 may include a variety of suitable pressure sensitive adhesives. Generally, pressure sensitive adhesives are adhesives (e.g., provided in rolled form, sheet form, etc.) that are configured to form a bond when pressure is applied (e.g., in the case of applying a compressive force to two rolled goods having a layer of pressure sensitive adhesive there between). The pressure sensitive adhesive may include a protective layer) that keeps the surface of the pressure sensitive adhesive free from debris (e.g., prior to joining of mating components, etc.). Layers 16, 18, 20, 56, 58, 60, 86, 88 and 90 can be made of similar materials to layers 114 and 112.

Assembly 100 can be manufactured in a dry film lamination process in which layer 114 is provided on substrate 104 or display element 102 and layer 112 is provided on substrate 106 or display element 102.

Figure 5:
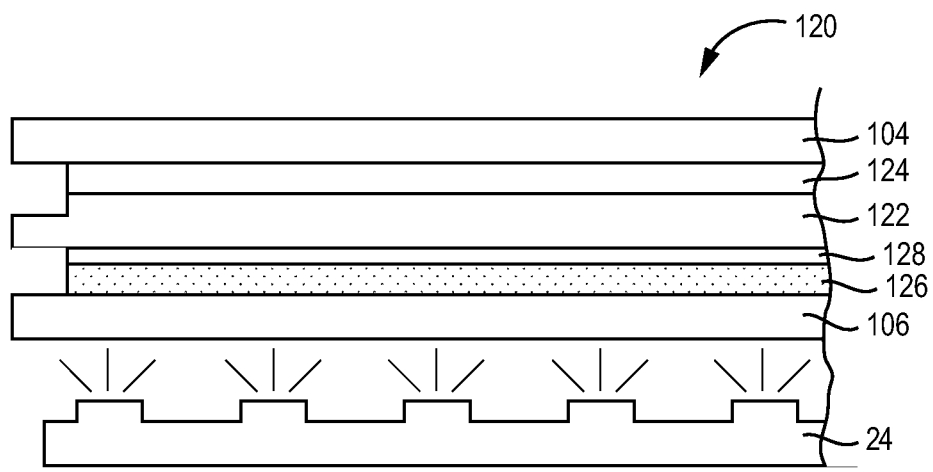
FIG. 5 is a side view schematic drawing of a display assembly in accordance with still another exemplary embodiment.

With reference to FIG. 5, a display assembly 120 includes substrates 104 and 106 and a display element 122 above backlight 24. Adhesive layers 124 and 126 can be configured for different levels of transmission and diffusion. Layer 124 can be a clear adhesive and layer 126 can be configured for diffusive effects. Layer 126 can be similar to layers 112 and 114 in one embodiment. Display element 122 can also include an optical film such as a dual brightness enhancing film 128. Film 128 can be applied to display element 122 with an adhesive layer. Layer 124 is a clear adhesive layer and is not configured for diffusion in one embodiment.

Figure 6:
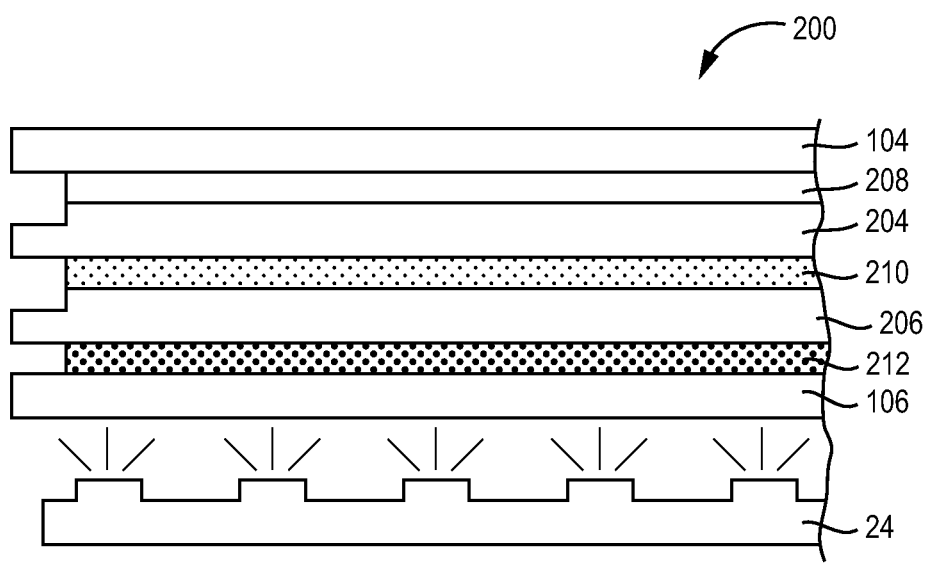
FIG. 6 is a side view schematic drawing of a display assembly in accordance with still another exemplary embodiment.

With reference to FIG. 6, display assembly 200 includes display elements 204 and 206. In one embodiment, display elements 204 and 206 are LCDs. Displays elements 204 and 206 are located between substrates 104 and 106. An adhesive layer 208 is provided between display element 204 and substrate 104, and an adhesive layer 210 is provided between display elements 204 and 206 in one embodiment. An adhesive layer 212 is provided between display element 206 and substrate 106.

In one embodiment, layer 208 can have a transmissiveness of 99% or greater and a haze of 0.7% or less in one embodiment. Layer 210 can have a transmissiveness of 90% and a haze of 40% and layer 212 can have a transmissiveness of 80% and a haze of 70% in one embodiment. Layers 208, 210 and 212 can be similar to layers 114 and 112 and be configured for diffusive effects. Although specific transmissiveness and haze values are described, other values can be utilized without departing from the scope of the invention. In one embodiment, layer 208 is clear adhesive and is not configured for diffusion.

LED backlight 24 can be provided with display assembly 200. Backlight 24 is provided on the back end of assembly 200 and substrate 104 is associated with a front end of assembly 100. Substrates 104 and 106 can be similar to substrates 12 and 14. Layers 208, 210, and 212 are similar to layers 16, 18, 20, 112, 114, 124, and 126.

With reference to FIG. 6, display assembly 200 uses adhesive layers 208, 210, and 212 to control alignment of display elements 204 and 206. In addition, ruggedization can be improved and immunity to vibration in humidity due to the coupling associated with layer 208. Display 200 can be manufactured by adhering display elements 204 and 206 together using layer 210 first in a dry film lamination process and then adhering substrate 104 and substrate 106 to display elements 204 and 206, respectively, using layers 208 and 212 in a dry film lamination process. Assembly 200 directly adheres to display elements 206 and 204 without conventional diffusers and thereby increases alignment accuracy. Display assembly 200 can be utilized for stereo viewing or 3D viewing.

Figure 7:
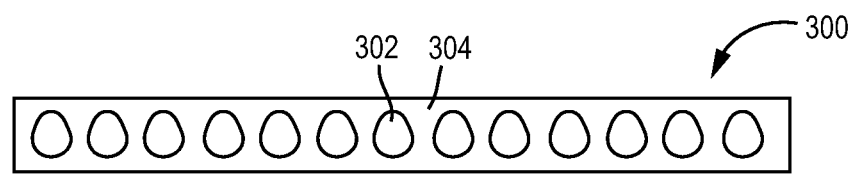
FIG. 7 is a more detailed side view schematic drawing of an exemplary adhesive layer for use in any of the optical and display assemblies illustrated in FIGS. 1-6.

With reference to FIG. 7, layer 300 is an adhesive configured for diffusion and can be used as layer 16, 18, 20, 56, 58, 60, 86, 88, 90, 112, 114, 124, 126, 208, 210 or 212. Layer 300 includes a matrix 304 and particles 302. In alternative embodiments, particles 302 can be more concentrated in certain areas of matrix 304 for enhanced diffusion or be shaped to increase diffusion along edges or in the center of an assembly. Particles 302 can be shaped in various ways to increase or decrease diffusion. In addition, various areas may be doped differently in matrix 304 depending upon the design of the optical assembly (such as the design for a particular display assembly).

Particles 302 can be shaped in an egg shape, disc shape or other shape and can be oriented with respect to their shape to provide diffusion. In one embodiment, particles 302 are provided in rows and columns and can stand straight up with respect to substrates 12 and 14. Rows and columns of particles 302 can also be stacked on top of each other. Particles 302 can also be arranged in circular and oval patterns.

In one embodiment, particles 302 are patterned in accordance with the placement of LEDs in backlight 24 (e.g. providing more diffusion at areas closer to each LED and less diffusion in areas where LEDs are less close). In another embodiment, particles 302 of different shapes are utilized.

Adhesive layer 300 can be stacked upon itself to achieve greater diffusion. Further, particles 302 can be tilted in different orientations to provide diffusion in particular areas. For example, particles 302 can be tilted towards a center of matrix 304 or towards edges to moderate diffusion.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components.

It is important to note that the construction and arrangement of the elements of the optical and display assemblies as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. An optical assembly comprising:
 a liquid crystal display assembly;
 a backlight source comprising light emitting diodes;
 a first translucent substrate;
 a second translucent substrate;
 a first layer of adhesive bonded to the first translucent substrate, the first layer of adhesive being configured for diffusive effects; and
 a second layer of adhesive bonded to the second translucent substrate, the second layer of adhesive being configured for diffusive effects, wherein the second layer of adhesive includes particles, the particles being patterned in association with placements of the light emitting diodes of a backlight, the particles being provided so that diffusion is greater in the second layer of adhesive at areas that are closer to a light emitting diode of the light emitting diodes; and a third layer of adhesive being configured to bond the LCD adhesive assembly to the next optical layer or optical component of the optical assembly;

wherein the first layer of adhesive, the second layer of adhesive, and the third layer of adhesive each have different diffusion characteristics, and the first layer of adhesive has a transmissiveness level that is less than a transmissiveness level of the second layer of adhesive.

2. The optical assembly of claim 1, wherein the second layer of adhesive has a first end and a second end, wherein the diffusion characteristics at the first end are different than diffusion characteristics at a second end.

3. The optical assembly of claim 1, wherein the second layer of adhesive is configured for diffusive effects with a concentration of ceramic, glass, metal or plastic particles.

4. The optical assembly of claim 3, wherein ceramic particles are aligned.

5. The optical assembly of claim 1, wherein the the second transmissiveness level is greater than the third transmissiveness level.

6. A method for making a laminated optical assembly, the method comprising:

providing a liquid crystal display (LCD) assembly;

providing a backlight source comprising light emitting diodes;

providing a first translucent substrate;

providing a second translucent substrate;

providing a first adhesive layer including particles for enhancing diffusion to a first side of the first substrate;

providing a second adhesive layer including particles for enhancing diffusion to a second side of the second substrate;

laminating the first substrate, the second substrate, and the LCD assembly to provide the optical assembly, wherein the particles in the second adhesive layer are patterned in accordance with a pattern of the light emitting diodes, the particles being patterned to provide more diffusion at areas closer to the light emitting diodes; and providing a third adhesive layer to bond the LCD assembly to the next optical layer or optical component of the optical assembly;

wherein the first adhesive layer, the second adhesive layer, and the third adhesive layer each have different diffusion characteristics, and the first layer of adhesive has a transmissiveness level that is less than a transmissiveness level of the second layer of adhesive.

7. The method of claim 6, wherein at least one of the first and second adhesive layers is a clear pressure sensitive adhesive.

8. The method of claim 6, wherein the first adhesive layer has a thickness of approximately 25-500 microns and the second adhesive layer has a thickness of approximately 25-500 microns.

9. The method of claim 6, wherein at least one of the first adhesive layer and the second adhesive layer is laminated using a roll-to-roll lamination process.

10. The method of claim 6, further comprising laminating the first substrate to a display component via the first adhesive layer to form a display assembly.

11. An optical assembly, comprising:

a first LCD assembly;

a second LCD assembly;

a backlight comprising light emitting diodes;

a first translucent substrate provided above the backlight;

a second translucent substrate provided above the first translucent substrate;

a first adhesive layer disposed on a first side of the first translucent substrate and bonded to the first LCD assembly, the first side being opposite a second side of the first translucent substrate, the second side being closer to the backlight than the first side, the first adhesive layer being optically clear and including particles for increasing optical diffusion; and a second adhesive layer disposed on a third side of the second translucent substrate and bonded to the second LCD assembly, the third side being opposite a fourth side of the second translucent substrate, the third side being closer to the backlight than the fourth side, the second adhesive layer including particles for increasing optical diffusion, wherein the particles in the first adhesive layer are patterned according to locations of the light emitting diodes, wherein the particles are patterned to provide higher diffusion at areas closer to the light emitting diodes; and a third adhesive layer to bond the first LCD assembly and the second LCD assembly;

wherein the first adhesive layer, the second adhesive layer, and the third adhesive layer each have different diffusion characteristics, and the first layer of adhesive has a transmissiveness level that is less than a transmissiveness level of the second layer of adhesive.

12. The optical assembly of claim 11, wherein the second adhesive layer provides less diffusion than the first adhesive layer.

13. The optical assembly of claim 11, wherein the first and second adhesive layers are clear pressure sensitive adhesive materials.

* * * * *